United States Patent [19]

Coleman

[11] Patent Number: 5,754,329
[45] Date of Patent: May 19, 1998

[54] ELECTROCHROMIC DISPLAY LAMINATES

[75] Inventor: James P. Coleman, Maryland Heights, Mo.

[73] Assignee: Monsanto Company, St. Louis, Mo.

[21] Appl. No.: 718,959

[22] Filed: Sep. 26, 1996

Related U.S. Application Data

[60] Continuation-in-part of Ser. No. 435,939, May 5, 1995, abandoned, which is a division of Ser. No. 994,813, Dec. 22, 1992, Pat. No. 5,413,739.

[51] Int. Cl.$^6$ .................................................. G02F 1/03
[52] U.S. Cl. ........................................... 359/254; 349/139
[58] Field of Search .................................. 359/271, 269, 359/254; 349/139

[56] References Cited

U.S. PATENT DOCUMENTS

| | | | |
|---|---|---|---|
| 3,674,342 | 7/1972 | Castellano et al. | 350/160 |
| 3,807,831 | 4/1974 | Soref | 350/160 |
| 3,978,007 | 8/1976 | Giglia et al. | 252/506 |
| 3,981,559 | 9/1976 | Channin | 350/160 |
| 4,116,544 | 9/1978 | Soref | 350/336 |
| 4,160,241 | 7/1979 | Shimizu et al. | 340/763 |
| 4,280,754 | 7/1981 | Yano et al. | 350/357 |
| 4,342,031 | 7/1982 | Lapeyre | 340/756 |
| 4,345,249 | 8/1982 | Togashi | 340/784 |
| 4,354,741 | 10/1982 | Mano et al. | 350/357 |
| 4,416,516 | 11/1983 | Beni et al. | 359/271 |
| 4,465,339 | 8/1984 | Baucke et al. | 350/357 |
| 4,550,982 | 11/1985 | Hirai | 350/357 |
| 4,596,722 | 6/1986 | Warzawski | 427/108 |
| 4,652,090 | 3/1987 | Uchikawa et al. | 350/357 |
| 4,746,200 | 5/1988 | Kamigaki | 350/357 |
| 4,750,817 | 6/1988 | Sammells | 350/357 |
| 4,810,067 | 3/1989 | Demiryont | 350/357 |
| 4,824,221 | 4/1989 | Endo et al. | 350/357 |
| 4,893,903 | 1/1990 | Thaker et al. | 350/331 |
| 4,902,110 | 2/1990 | Green | 350/357 |
| 4,966,675 | 10/1990 | Steininger | 209/490 |
| 5,011,582 | 4/1991 | Oshikawa et al. | 204/140 |
| 5,078,480 | 1/1992 | Warszawski | 359/265 |
| 5,104,583 | 4/1992 | Richardson | 252/518 |
| 5,189,549 | 2/1993 | Leventis et al. | 359/271 |
| 5,216,536 | 6/1993 | Agrawal et al. | 359/274 |
| 5,227,252 | 7/1993 | Murayama et al. | 428/690 |
| 5,413,739 | 5/1995 | Coleman | 252/511 |
| 5,442,478 | 8/1995 | Lampert et al. | 359/273 |
| 5,500,759 | 3/1996 | Coleman | 359/270 |
| 5,548,421 | 8/1996 | Miyazake | 349/139 |
| 5,576,867 | 11/1996 | Baur et al. | 349/142 |
| 5,600,464 | 2/1997 | Ohe et al. | 349/123 |

FOREIGN PATENT DOCUMENTS

| | | | |
|---|---|---|---|
| 966923 | 4/1975 | Canada | 345/55 |
| 1154135 | 6/1983 | Canada | G02F 1/17 |
| 0193978 | 9/1986 | European Pat. Off. | C25D 13/08 |
| 0333700 | 9/1989 | European Pat. Off. | H01M 4/00 |
| 0341554 | 11/1989 | European Pat. Off. | D06M 11/12 |
| 0403180 | 12/1990 | European Pat. Off. | C09C 1/62 |
| 0486387 | 5/1992 | European Pat. Off. | G02F 1/153 |
| 38109293 | 10/1988 | Germany | G02F 1/17 |
| 59-113422 | 6/1984 | Japan | G02F 1/17 |
| 0226064 | 12/1984 | Japan . | |
| 0099174 | 6/1985 | Japan . | |
| 0181172 | 9/1985 | Japan . | |
| 0229964 | 11/1985 | Japan . | |
| 62-044719 | 2/1987 | Japan | G02F 1/17 |
| 62-049333 | 3/1987 | Japan | G02F 1/17 |
| 63-199325 | 8/1988 | Japan . | |
| 63-207856 | 8/1988 | Japan | C08L 101/00 |
| 1107135 | 4/1989 | Japan | G01N 21/77 |
| 3275658 | 11/1989 | Japan . | |
| 61-185730 | 8/1996 | Japan | G02F 1/17 |
| WO 87/01515 | 3/1987 | WIPO . | |
| WO 92/18896 | 10/1992 | WIPO | G02F 1/155 |
| WO 92/19694 | 11/1992 | WIPO | C09K 9/02 |
| WO 93/21557 | 10/1993 | WIPO | G02F 1/15 |
| WO 93/21558 | 10/1993 | WIPO | G02F 1/155 |
| WO 93/22707 | 11/1993 | WIPO | G02F 1/53 |
| WO 94/15246 | 7/1994 | WIPO | G02F 1/15 |

OTHER PUBLICATIONS

Nomura et al., J. Macromol. Sci.–Chem., A26(2&3), pp. 593–608 (1989), Electrochemical and Electochromic Properties of Polymer Complex Films Composed of Polytetramethyleneviologen and Poly–[p–styrenesulfonic Acid] Containing a Conductive Powder.

Masumi, Proc. of SID 1982, vol. 23/4, pp. 245–248, "Response–Improved Display Based on Organic Materials".

Orel et al., J. Electrochem. Soc. vol. 141, No. 9, pp. L127–L130, Sep., 1994, "Electrochemical and Structural Porperties of SnO$_2$ and Sb:SnO$_2$ Transparent Electrodes with Mixed Electronically Conductive and Ion–Storage Characteristics".

*Primary Examiner*—Georgia Y. Epps
*Assistant Examiner*—Thomas Robbins
*Attorney, Agent, or Firm*—Howell & Haferkamp, L.C.

[57] ABSTRACT

A laminate electrochromic display is disclosed in which a layer containing electrode leads addresses a laminate layer of side-by-side working and counter electrodes. A laminate layer of an electrochromic material is disposed on the electrode layer and, optionally, an ionically conductive electrolyte material is included in the electrochromic layer or provided in a separate electrolyte layer disposed over the electrochromic layer. In addition, a sandwich-type electrochromic device is disclosed in which the electrodes serve as either working or counter electrodes and a transparent electrode, disposed over the electrochromic layer serves as the other electrode. The electrochromic layer can optionally contain an ionically conductive electrolyte or, alternatively, a separate layer containing the electrolyte can be disposed between the electrochromic layer and counter electrode layer.

65 Claims, 5 Drawing Sheets

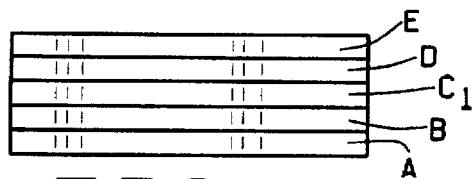
FIG. 1
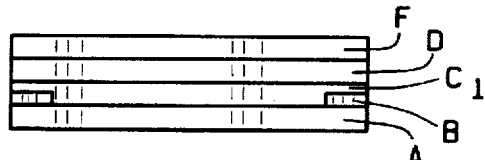
FIG. 2
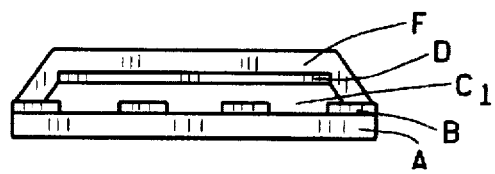
FIG. 3
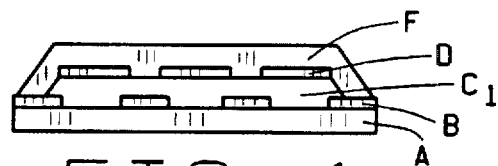
FIG. 4
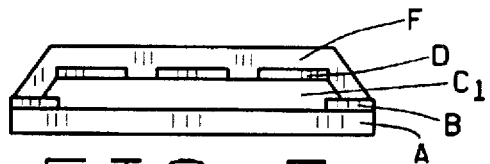
FIG. 5
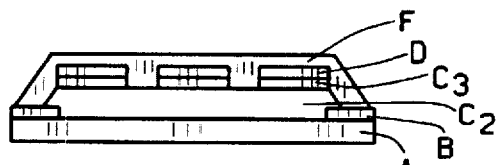
FIG. 6
o—LESS FILLING———
o—TASTE GREAT————
FIG. 7

ELECTROCHROMIC DISPLAY LAMINATES

CROSS-REFERENCES TO RELATED APPLICATIONS

This application is a continuation-in-part of application Ser. No. 08/435,939 filed May 5, 1995, now abandoned which is a division of application Ser. No. 07/994,813 filed Dec. 22, 1992, now U.S. Pat. No. 5,413,739, the disclosures of all of which are incorporated herein by reference.

BACKGROUND OF THE INVENTION

(1) Field of the Invention

The present invention relates to electrochromic light-modulating devices and, more particularly, to laminate electrochromic displays having an array of electrochromic display segments, and to laminate electrode structures suitable for selectively addressing an array of electrochromic display segments.

(2) Description of the Related Art

Image display devices using materials which produce coloration or changes in optical density as a result of electrochemical oxidation reduction processes, such as electrochromic materials, are well known in the art. Such displays utilize an ionically conductive material, such as an electrolyte material, in contact with the electrochromic material. By applying an electrical potential across an interface of the electrolyte material and the electrochromic material, an electrochromic effect is generated which changes the color or optical density or reflectance of the electrochromic material.

A large number of electrochromic displays utilize a layered approach for the construction of the display, where electrodes are typically provided for applying a voltage across an interface of an electrolyte layer and an electrochromic layer. In such displays, the electrolyte and electrochromic layers are sandwiched between working and counter electrodes. Upon applying a voltage across the electrodes, an induced current flows from the working electrode, across the interface of the electrolyte and electrochromic layers to produce an electrochromic effect, and to the counter electrode. However, because the electrochromic color change occurs at the interface of the electrolyte and electrochromic layers that is sandwiched between the electrodes, at least one of the electrodes must be transparent so that the electrochromic effect can be observed.

Transparent electrodes typically have a high resistance and, therefore, can significantly decrease the overall conductivity of the display device and increase the voltage required for switching. This increases the power requirements of the display even though low power operation is usually desired, particularly for applications requiring independent operation such as with batteries.

It is also known that for electrochromic displays having multiple electrochromic display segments, such as a seven segment display, the driving conditions for each individual segment must be normalized if it is desired for each activated segment to have the same optical density. In the case of a seven segment display, for example, when a particular digit is displayed by selective activation of some or all of the seven display segments, it is generally desirable for each activated segment to have the same degree of color.

Because colorization in electrochromic display devices is an electrochemical reaction, color density is proportional to the quantity of electricity flowing in the display segment per square area. Thus, if many segments are driven simultaneously at a specified voltage for a specified period of time, each segment may have a different color density depending on the amount of current flowing therethrough. Of course, the current value will depend on several factors, including the area of the working electrode, the area of the electrochromic material disposed on the working electrode, the area of the electrical lead which conducts the applied voltage to the working electrode, the number of display segments that are simultaneously activated, etc.

An example of an electrochromic display which controls the driving conditions of each display segment is disclosed in U.S. Pat. No. 4,160,241. Several electrical leads are disposed adjacent to the working electrodes for the electrochromic display segments. Each electrical lead contacts one of the working electrodes for selectively conducting electrical potentials thereto, but must be routed so as to avoid contact with other electrical leads and working electrodes to prevent unwanted electrical shorting. The area of each electrochromic display segment is substantially equalized with the other segments, and for those that differ in size, the output impedance of the driving circuit is adjusted. Moreover, the resistances of the electrical leads which selectively activate each display segment are also substantially equalized by varying the width of each lead in proportion to its length, as shown in FIGS. 8a and 8b of this reference. Nevertheless, because this reference uses a sandwich type electrode arrangement with high resistance transparent electrodes, lead resistance would provide no more than a minimal contribution to the overall resistances whether or not the lead resistances were equalized. Furthermore, altering the widths of the electrical leads in this manner adds additional complexity to the overall electrical lead layout, particularly if more than seven display segments are to be used.

It would thus be desirable to provide an electrochromic display having a large number of electrochromic display segments arranged in an array, such as a rectangular five by seven array, so that a desired image could be displayed by selectively activating individual display segments. However, electrical lead layout necessary for selectively activating the display segments would be unduly complicated due to the circuitous path required of each electrical lead to avoid contact and electrical shorting with the other electrical leads, as well as with all but one of the thirty-five display segments of the rectangular array. Moreover, the electrical lead layout would become even more complex if the widths of the electrical leads are to be varied in proportion to their length in an effort to control the driving conditions for the electrochromic display.

What is needed is an electrochromic display having a large number of electrochromic display segments which can be selectively activated to display a desired image. Preferably, the electrolyte and electrochromic materials are not sandwiched between working electrode and counter electrode layers so that use of high resistance transparent electrodes is unnecessary. Such an electrochromic display should also have a simplified electrical lead layout even though a large number of electrical leads must be used to selectively activate the large number of electrochromic display segments. The simplified electrical lead layout should also permit the resistance of each electrical lead to be easily equalized with the other electrical leads by varying its width in proportion to its length. Further, an electrode structure is needed which has a large number of side-by-side working electrodes suitable for selectively addressing a large number of electrochromic display segments. The simplified electrical lead layout, discussed above, for selectively conducting electrical potentials to the working electrodes would also be beneficial to the electrode structure. Such an electrode structure could thus be easily converted into a desirable electrochromic display by applying electrochromic display segments and an electrolyte material over each working electrode.

SUMMARY OF THE INVENTION

Accordingly, the inventor hereof has succeeded in designing and developing a laminate electrochromic display where the working electrode and the counter electrode are provided in a single layer between a substrate and an electrochromic layer. Upon applying an electrical potential across the working and counter electrodes, an induced current will flow up from the working electrode, through the interface of the electrochromic and electrolyte layers to generate an electrochromic effect, and then through the electrolyte layer and down to the counter electrode. Because the electrochromic and electrolyte layers are not sandwiched between working and counter electrode layers, the electrodes do not obscure observation of the generated electrochromic effect. Thus, neither electrode need be a high resistance transparent electrode.

Additionally, providing both the working electrode and the counter electrode in a single layer allows these electrodes to be simultaneously applied during manufacture of the display, such as by high speed printing techniques. Consequently, the prior art steps of applying the counter electrode in one layer and providing the working electrode in another is reduced to the single step of simultaneously applying both the working and counter electrodes in a single layer, thereby decreasing manufacturing costs while increasing the speed at which the laminate electrochromic display can be manufactured.

The inventor has also developed laminate electrochromic displays having multiple, and preferably a large number of working electrodes provided in a single layer with a counter electrode which extends adjacent to, and preferably surrounds, each working electrode. In one embodiment, thirty-five working electrodes are arranged in a rectangular, five-by-seven array with an electrochromic material disposed thereon, and can be selectively activated to display a desired image. In this embodiment, the working electrodes are more properly referred to as "pixel electrodes" because the electrochromic effect generated over each working electrode will typically be only a single element of the overall generated image. Alternatively, the working electrodes can be arranged in a radial pattern, such as for providing an electrochromic analog clock display, or in any other image defining pattern.

The laminate electrochromic displays of the present invention can be comprised of electrodes arranged in a side-by-side configuration or in a sandwich-type configuration. The side-by-side electrochromic displays are comprised of a laminate layer of a nonconductive substrate material, a laminate layer containing side-by-side electrodes including a counter electrode and a plurality of working electrodes, a laminate layer comprising an electrochromic material disposed on the working electrodes, and a laminate layer comprising an ionically conductive material disposed over the electrochromic layer. Optionally, the electrochromic material and ionically conductive material comprise a single laminate layer.

In one embodiment of the sandwich type arrangement of electrodes, a laminate layer comprised of a plurality of side-by-side counter electrodes is disposed on a nonconductive substrate with an ionically conductive material disposed over the laminate layer of side-by-side counter electrodes, a laminate layer of electrochromic material disposed over the ionically conductive layer and a laminate layer comprised of a transparent electrode disposed over the electrochromic layer. Optionally, the electrochromic material and ionically conductive material can comprise a single laminate layer.

In another embodiment of the sandwich-type of arrangement of electrodes, a laminate layer comprised of a plurality of side-by-side working electrodes is disposed on a nonconductive substrate with a laminate layer of electrochromic material disposed over the laminate layer of side-by-side working electrodes, a laminate layer of an ionically conductive material disposed over the electrochromic layer and a laminate layer comprised of a transparent electrode disposed over the ionically conductive layer. Optionally, the electrochromic material and ionically conductive material can comprise a single laminate layer.

In yet another embodiment of the sandwich-type arrangement of electrodes, a laminate layer comprised of a plurality of side-by-side electrodes is disposed on a nonconductive substrate with a laminate layer of first electrochromic material disposed over the laminate layer of side-by-side electrodes, a laminate layer of an ionically conductive material disposed over the electrochromic layer, a laminate layer of second electrochromic material disposed over the ionically conductive layer wherein the second electrochromic material is substantially transparent in one oxidation state and a laminate layer comprised of a transparent electrode disposed over the ionically conductive layer.

The electrochromic layer may comprise an electrochromic material dissolved in a polymer matrix, or electrically conductive electrochromic particles dispersed in a polymer matrix. Moreover, the electrochromic layer preferably comprises a plurality of electrochromic display segments, with each working electrode having an electrochromic display segment disposed thereon. The ionically conductive layer preferably contacts each electrochromic display segment as well as the counter electrode to thereby electrically connect the working electrodes to the counter electrode through the electrochromic display segments and the ionically conductive layer. The nonconductive substrate material is preferably a flexible polymeric material.

The present invention also provides a novel laminate electrode structure which facilitates the construction of the laminate electrochromic displays described above. The laminate electrode structure includes a nonconductive substrate having several electrical leads disposed thereon. Each electrical lead has opposite ends and a central length extending therebetween, with a laminate layer comprising an insulative material disposed over the central lengths of the electrical leads. The insulative layer preferably comprises a polymeric coating of an acrylic, polyurethane, or polyamide material. A laminate layer comprising a plurality of side-by-side working electrodes is disposed over the insulative layer and the layer of electrical leads with each working electrode disposed over and in electrical contact with one of the electrical lead ends. The working electrode layer can optionally include one or more counter electrodes.

By providing the electrical leads in a separate layer from the working electrodes, the electrical lead layout can be substantially simplified, and the working electrode layout can be devised without any concern of undesirable shorting between the working electrodes and the electrical leads. Thus, a portion of an electrical lead which is intended to contact a working electrode disposed thereover will not be coated with the insulative layer, while other portions of that electrical lead which should avoid contact with any other working electrodes disposed thereover will have the insulative material applied thereon. In this manner, several of the working electrodes will be isolated from the central lengths of the electrical leads by the insulative layer. In addition to simplifying the electrical lead layout so as to decrease manufacturing and design costs, this electrical lead layout also enables the widths of the electrical leads to be varied in proportion to their lengths. This equalizes the electrical resistance of all the electrical leads and facilitates control of the driving conditions of the working electrodes in a simplified manner without resort to additional circuitry.

While the principal advantages and features of the present invention have been described above, a greater understanding may be attained by referring to the drawings and the detailed description of the preferred embodiments which follow.

BRIEF DESCRIPTION OF THE DRAWINGS

FIGS. 1–6 are partial side views of laminate electrochromic displays;

FIG. 7 is a view of an electrode pattern for an electrochromic display;

DETAILED DESCRIPTION OF THE PREFERRED EMBODIMENTS

Figure 9:
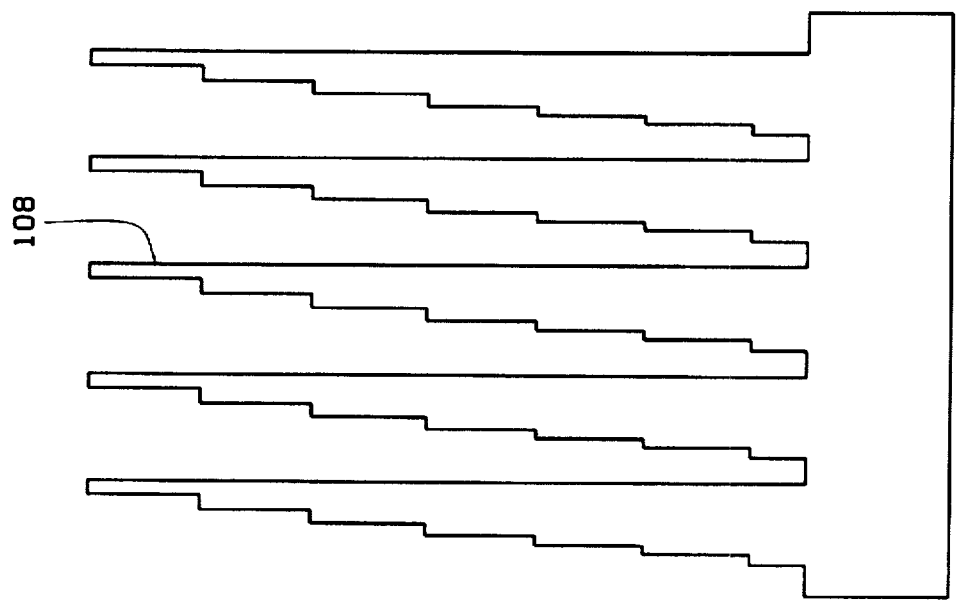
FIG. 9 is a top view of an insulative layer for covering the central lengths of the working and counter electrode leads of FIG. 8.

As used herein, the term "electrochromic" refers to a material which changes color when subjected to an electrical potential. Such electrochromic materials are known in the art and include polyaniline, polypyrrole, polythiophene, nickel oxide, polyvinylferrocene, polyviologen, tungsten oxide, iridium oxide, molybdenum oxide, and Prussian blue (ferric ferrocyanide).

As used herein, the term "electrically conductive" refers to a material which conducts electricity including metals such as copper, nickel, and aluminum, metal oxides such as tin oxide, tin-doped indium oxide (ITO), and antimony-doped tin oxide (ATO), metal flake in a polymer or resin such as silver flake ink, carbon such as graphite or lampblack, and conductive polymers such as polyaniline and polypyrrole. Such electrically conductive materials are useful as electrical leads and electrodes in electrochromic displays. When electrically conductive materials are used as electrical leads or electrodes, e.g., in displays or other devices, electrochromic or electrolyte materials in contact with these electrically conductive materials can be electrochemically active, e.g., polyaniline can oxidize copper electrodes. Thus, where extended life is desired, an appropriate electrically conductive material should be selected so as to minimize electrochemical instability arising from contact with electrochromic or electrolyte materials.

This invention provides laminate electrochromic displays having electrochromic materials applied in a laminate layer between an electrode layer and an ionically conductive layer. The electrode layer preferably contains several side-by-side working electrodes and, optionally, one or more counter electrodes. The electrochromic layer may comprise an electrochromic material dissolved or dispersed in a polymer matrix. Alternatively, the electrochromic layer can be a composite layer of an electrochromic material such as polyaniline disposed over a layer of electrically conductive, non-electrochromic particles dispersed in a polymer matrix, e.g., titanium dioxide particles coated with ATO dispersed in a rubber matrix. The electrochromic layer is preferably electrically conductive and essentially ionically isolative, as described below.

This invention also provides laminate electrode structures suitable for constructing laminate electrochromic displays. The laminate electrode structure includes a laminate layer of electrodes comprising several side-by-side working electrodes and, optionally, one or more counter electrodes. Due to the complexity and circuitous nature of providing an electrical lead layout in the same layer as the several side-by-side electrodes, the present invention utilizes a separate laminate layer for the electrical leads, which significantly simplifies the design and manufacture of both the electrode and the electrical lead layers. Another laminate layer which comprises an electrically insulative layer is disposed between the electrical lead and electrode layers to electrically isolate portions of the electrical leads from electrodes positioned thereover. Laminate electrochromic displays can be easily constructed from the laminate electrode structure of the present invention by applying electrochromic and electrolyte materials over the working electrodes, and applying one or more counter electrodes to the electrolyte layer, if necessary.

Electrically conductive particles can also be used in place of the electrochromic material and the preparation of such particles is disclosed in U.S. Pat. No. 5,413,739. The electrically conductive particles are comprised of (a) an electrically conductive core coated with an electrochromic material, (b) an electrochromic material core and an electrically conductive coating, (c) an electrically conductive electrochromic material, (d) agglomerations of electrochromic material and electrically conductive material, or (e) electrically conductive material. When the dispersed particles are in a processable polymer matrix, the composite can be cast into films useful in the laminate layers of a laminate electrochromic display. Another aspect of this invention provides inks, adaptable to a variety of printing methods, comprising an emulsion or solution of polymer having electrically conductive, preferably also electrochromic, materials or particles dispersed therein.

In the laminate electrochromic displays of this invention, the electrically conductive materials or particles can be provided in a composite with a polymer matrix. In the case of visual displays, it is generally preferred that the polymer matrix transmit visible light, i.e., be transparent or translucent to the visible light spectrum, and more preferably be optically clear. The electrochromic materials or particles can be dissolved or dispersed in the polymer by a variety of methods. The dispersion or solution can be in molten polymer or in solutions of polymer, e.g., toluene solutions of polybutadiene or aqueous emulsions of polyvinyl chloride, by homogenization blending. While the polymer can be thermoset, thermoplastic, or elastomeric, in many cases it is preferred that the polymer be optically transparent or translucent, and more preferably optically clear, thermoplastic polymer. Useful thermoplastic polymers include polystyrene, polyacrylates, polymethacrylates such as polymethylmethacrylate, polyurethanes, polyolefins such as high or low density polyethylene, linear low density polyethylene and polypropylene, polyesters such as polyethylene terephthalate (PET), polyamides such as nylon-6 and nylon-6,6, polycarbonate, polyvinylchloride (PVC), polyvinylacetal such as polyvinylbutyral, polyvinyl esters such as polyvinylacetate, polyvinyl alcohol, copolymers such as ethylene vinylacetate copolymer, styrene-acrylonitrile copolymer and styrene maleic anhydride copolymer, graft copolymers such as ABS, and blends thereof. Useful thermoset polymers include epoxy resins, polyester resins, phenol formaldehyde reins, and bismaleimide reins. Useful elastomers include acrylic rubber such as polybutylacrylate, olefin rubber such as polybutadiene, EPDM rubber, EP rubber, styrene butadiene rubber and nitrile rubber, and thermoplastic elastomers such as styrene-butadiene block copolymers and blends of polypropylene and EPDM.

The above polymers and other polymers useful in this invention are chosen because they do not conduct ions. It is not known whether all of the above-described polymers absolutely do not transmit ions, e.g., at some de minimis level. In this regard, it is expected that there is a threshold ion transmission level that can be tolerated. Regardless, the above polymers and other useful unnamed polymers are characterized as "essentially ionically isolative." The polymer melt or solution containing dispersed electroconductive particles or dissolved electrochromic material can be applied as a coating by conventional and well-known methods. Preferably, the polymer is applied as a thin coating, e.g., about one to twenty-five micrometers thick, which forms a polymeric film, e.g., upon solidification of the melt or evaporation of solvent. The polymeric film is disposed as a polymer matrix having dissolved therein electrochromic material, or dispersed therein electroconductive particles at a sufficiently high density, so as to provide a moderate electrical resistance, e.g., on the order of 100 to 1,000 ohms, so that the composite polymer layer is electrically conductive.

One aspect of this invention provides a laminate electrochromic display comprising: (a) a flexible substrate; (b) a laminate layer of electrical leads applied over the substrate; (c) a laminate layer of both working and counter electrodes applied over the electrical lead layer; (d) a laminate layer containing an electrochromic material applied over the electrode layer, where the electrochromic layer is preferably electrically conductive and essentially ionically isolative; and (e) a laminate layer containing a visible light transmitting, ionically conductive material, such as an electrolyte material, applied over the electrochromic layer. Another aspect of this invention provides a similar laminate electrochromic display to that immediately described above, but where the working and counter electrodes are applied in separate layers on opposite sides of the electrochromic and ionically conductive layers.

The interface between the electrolyte layer and the electrochromic layer is electrochromically activatable when an electrical potential is applied across the interface via the electrical leads and the working and counter electrodes. For instance, the electrical resistance of a thin electrochromic composite layer is sufficiently high that side-by-side working and counter electrodes at a differential voltage can be provided in a single layer under the electrochromic layer without excessive short circuit current between the electrodes. In this case, where a single layer comprising an electrochromic material is disposed over both the working and counter electrodes, these electrodes are spaced such that the width between a working electrode and a counter electrode is substantially greater than the thickness of the electrochromic layer disposed thereover. In this manner, the path of least electrical resistance from a working electrode to the counter electrode (assuming a positive reference voltage is applied to the working electrode) is through the electrochromic layer to the electrolyte layer, through the electrolyte layer to the area over the counter electrode, and back through the electrochromic layer to the counter electrode. The electrochromic effect is observed at the interface between the electrochromic and electrolyte layers. Providing working and counter electrodes in a side-by-side configuration is desirable as it eliminates any need for transparent electrodes which may be more expensive and which typically have an undesirably high resistance. The configuration also eliminates the manufacturing step of applying a transparent counter electrode to the electrolyte layer.

A transfer of electrons to the electrochromic material requires ion transfer to or from the electrochromic material. Because the preferred electrochromic layer is essentially ionically nonconductive, ion transfer from the ionically conductive layer to the electrochromic material occurs at the interface between the layers and not substantially at the underlying electrode structure. The mobility of ions to or from the electrochromic material at the interface allows electron transfer to the mobile ion-receptive electrochromic material at the interface. A change in the electron oxidation state of the electrochromic material results in a change in color in the material at the interface. By arranging electrodes in patterns, a variety of images can be generated by the electrochromic effect. The electrodes can also be arranged in a matrix array so that selective activation of the electrochromic material disposed over the electrodes will produce the desired image. In certain preferred aspects of this invention, the electrochromic image is erasable by removal or reversal of the electrical potential that created the image.

In one embodiment using a side-by-side arrangement of electrodes, the electrochromic layer can be applied over both the working and counter electrodes. When using electrochromic materials that have contrasting colors or degrees of reflectance in the oxidized and reduced states, this results in an enhancement in the contrast between working and counter electrodes. Thus, application of a current to the working electrode and electrochromic material in contact with the working electrode produces a change in color or optical density, such as for example an increase in optical density, in the region of the working electrode. Simultaneously, the electrochromic material also changes color or optical density, such as for example a decrease in optical density, in the region of the counter electrode. This is different from the sandwich-type arrangement of electrodes in which it is preferred that any color or optical density effect in the counter electrode, the ionically conductive electrolyte layer or the interface between the electrochromic layer and ionically conductive electrolyte layer be complementary to the change in color or optical density in the electrochromic layer in contact with the working electrode.

As is understood by those skilled in the art of electrochromic displays, the term "working electrode" refers to the electrode to which a source voltage is selectively applied to induce an electrochromic effect. The term "counter electrode," on the other hand, refers to the electrode having a reference voltage applied thereto, typically in a continuous manner. Thus, an electrochromic effect is generated by selectively applying a source voltage—positive or negative depending on the type of electrochromic material employed—to one or more working electrodes while continuously applying the reference voltage to the counter electrode. A single counter electrode or multiple counter electrodes can be employed to operate in conjunction with numerous working electrodes.

In the laminate electrochromic displays of this invention, the ionically conductive layer comprises an aqueous or organic solvent-containing polymeric gel. Such an ionically conductive layer contacts the electrochromic material to provide an interface for generating electrochromic effects. The preferred ionically conductive layer comprises an aqueous polymeric gel which contains a humectant or hygroscopic filler. Useful hygroscopic material includes deliquescent material such as lithium chloride, calcium chloride, glycerine, sodium dihydrogen phosphate, or lithium trifluoromethylsulfonate. A preferred aqueous polymeric gel is polyacrylamidomethylpropanesulfonate, known as POLYAMPS. In certain of the laminate electrochromic displays of this invention, the ionically conductive layer is coated with a non-conducting, preferably light transmitting, barrier layer to maintain the gel-like character of the layer. In other cases, the ionically conductive layer is coated with a light transmitting electrode material, e.g., ITO, in a pattern or a film.

Still another aspect of this invention provides a laminate electrode structure for selectively addressing an array of working electrodes, and which facilitates construction of the laminate electrochromic displays discussed above. The preferred laminate electrode structure comprises: (a) a flexible substrate; (b) a laminate layer of electrical leads applied on the substrate, where each lead has one end terminating at a substrate connector region, the other end in contact with a working electrode, and a central length extending between the opposite ends; (c) a laminate layer containing an insulative material applied over the central lengths of the electrical leads; and (d) a laminate layer containing an array of working electrodes applied over the electrical lead and insulative layers with each working electrode in contact with one of the electrical lead ends. One or more of the working electrodes are isolated from the central lengths of the electrical leads extending thereunder by the insulative layer. Depending on the type of laminate electrochromic display to be subsequently constructed, the laminate electrode structure may also comprise one or more counter electrodes in a side-by-side arrangement with the working electrodes.

The flexible substrate is preferably constructed from a flexible polymeric material. The electrodes preferably comprise metal, metal oxide, carbon, intrinsically conductive polymer, or polymer composite having an electrical resistance substantially lower than the electrical resistance of the composite material of dissolved electrochromic material or dispersed particles which will be disposed thereover during the construction of a laminate electrochromic display.

As eluded to above, providing the electrical leads in a separate layer below the electrode layer significantly simplifies the complexity of the electrical lead layout. This design allows the electrical leads to extend from a connector region of the substrate, where electrical potentials are applied to the leads, straight to the corresponding electrode for that electrical lead, where the electrical lead contacts its corresponding electrode on a bottom side thereof. Thus, the complex and circuitous electrical lead layouts of the prior art are eliminated, thereby decreasing design and manufacturing costs. Providing the electrical leads in a layer separate from the electrode layer also simplifies the complexity of the electrode layout, thereby further reducing design and manufacturing costs for the laminate electrode structure, as well as for laminate electrochromic displays constructed therefrom. Simplifying the electrical lead layout in this manner also enables the widths of the individual electrical leads to be varied in proportion to their length so as to normalize the electrical resistances of all of the electrical leads.

FIGS. 1–6 illustrate a variety of laminate electrochromic displays made possible by this invention. These laminate displays comprise a substrate A, e.g., a nonconductive layer of polyethylene terephthalate (PET) film, coated with a conductive layer B of one or more electrodes, e.g., metal, metal oxide, conductive polymer, or carbon. Layer $C_1$ is an electrically conductive, essentially ionically isolative, electrochromic composite layer comprising a dispersion of electrically conductive, electrochromic particles in a polymer matrix, e.g., titanium dioxide particles coated with ATO and polyaniline dispersed in a rubber matrix. Layer $C_2$ is an electrically conductive, essentially ionically isolative composite layer comprising a dispersion of electrically conductive but non-electrochromic particles in a polymer matrix, e.g., titanium dioxide particles coated with ATO dispersed in a rubber matrix. Layer $C_3$ is a layer of electrochromic material, e.g., polyaniline. Layer D is an ionically conductive layer, e.g., POLYAMPS gel. Transparent conductor layer E, e.g., an ITO coated film, can serve as an electrode and transparent, insulating layer F, e.g., a PET film, can serve to prevent the loss of electrolyte from the ionically conductive layer.

With reference to FIG. 1, an electric potential applied between electrodes B and E will create an electrochromic effect at the interface of layers $C_1$ and D. FIG. 2 illustrates a display having side-by-side working and counter electrodes B on substrate A. Because the conductivity of the electrochromic composite layer $C_1$ is less than the conductivity of the ionically conductive layer D, current will preferentially flow from one electrode through the electrochromic composite layer to the ionically conductive layer, and then through the ionically conductive layer to the area above the other electrode where it will pass in a reverse direction through the electrochromic layer to reach the other electrode. Where the electrochromic material changes color with the loss of an anion, the electrochromic effect will be visible over one electrode. Where the electrochromic material changes color with both the gain and loss of an anion, e.g., as in the case of polyaniline, electrochromic effects will be visible over both electrodes.

FIGS. 3, 4, 5 and 6 illustrate bipolar electrodes. In FIGS. 3 and 4, an electrical potential across the outer electrodes will generate bipolar potentials at different halves of the intermediate electrodes so as to create opposite electrochromic effects in the interface of layers $C_1$ and D over the bipolar charged ends of each intermediate electrode. In FIG. 5, the opposite electrochromic effects are created at the interface between layers $C_1$ and D under the edges of the segmented electrolyte layer D. In FIG. 6, the opposite electrochromic effects are created at edges of the interface of the electrochromic display segments $C_3$ and the segmented ionically conductive layer D.

A method for constructing the laminate electrode structure used in the laminate electrochromic displays of the present invention will now be described. The laminate electrode structure includes a plurality of electrical leads for separately addressing each working electrode, and can be constructed from the several successive layers illustrated in FIGS. 8–10. A laminate layer of electrical leads is first printed on a nonconductive substrate 100 in the pattern depicted in FIG. 8, which includes several working electrode leads 102 and several counter electrode leads 104. All of the leads terminate on one end at a connector region 101 of substrate 100 to facilitate selective application of an electrical potential across one or more of the working electrode leads 102 and the counter electrode leads 104. The connector region 101 protrudes from one edge of the substrate 100 as is common in the art to facilitate mating of the connector region 101 with a complementary connector (not shown). From the connector region 101, each electrical lead 102, 104 extends along its central length to an opposite end where the lead will contact either a working or counter electrode as described below.

Figure 8:
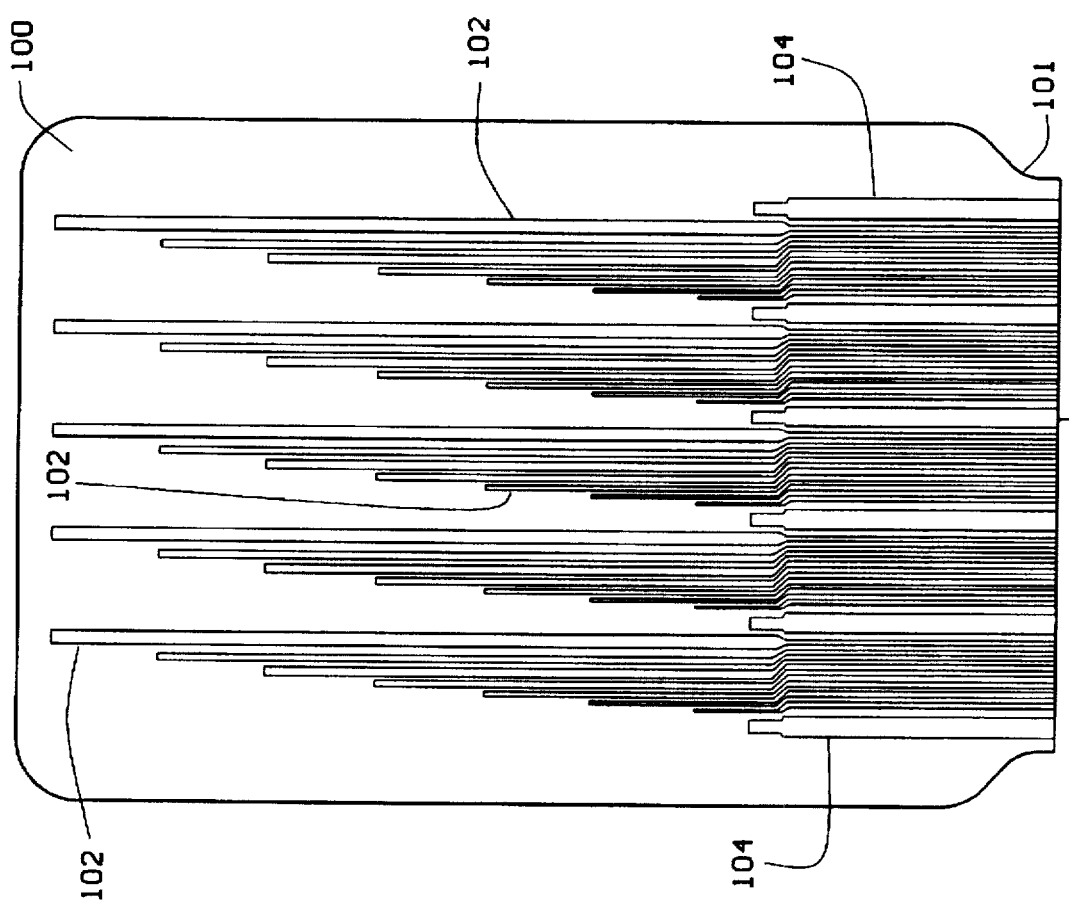
FIG. 8 is a top view of a substrate having working electrode leads and counter electrode leads disposed thereon.

The widths of the working electrode leads 102 are increased in proportion to their length so that the conductivity of all of the working leads 102 is the same regardless of length. In this embodiment, the lengths of the counter electrode leads are the same and, therefore, the widths of these leads need not be varied. Both the working electrode leads 102 and the counter electrode leads 104 are first printed using silver ink, and then substantial portions of the leads are overprinted with a slightly wider carbon ink to prevent corrosion. The ends of the silver printed leads which will ultimately contact bottom sides of the electrodes are preferably not overprinted with the carbon ink so that the ends of the silver printed leads will directly contact the silver printed electrodes, as will be apparent. As shown in FIG. 8, the working electrode leads are grouped into several lead sets where each set includes seven working electrode leads with a counter electrode lead 104 provided on both sides of each working electrode lead set.

A laminate layer comprising an insulative material, preferably a dielectric material having insulative properties, is next applied over the electrical lead layer in the pattern depicted in FIG. 9. As can be seen in the drawing, the pattern of the insulative material 108 is such that only the central lengths of the working electrode leads 102 and the counter electrode leads 104 will be covered by the insulative layer of FIG. 9. As stated above, the silver printed ends of the electrical leads are not overprinted with carbon so there will be a silver-to-silver interface between the ends of the leads and the electrodes to be applied thereover. Similarly, the silver printed ends of the leads are not overprinted with the insulative material for the same reason. The ends of the electrical leads which terminate at the connector region 101 of substrate 100 are also not overprinted with the insulative material 108 so as to facilitate an electrical connection between these lead ends and a card connector (not shown). Thus, in this embodiment, only the central lengths of the electrical leads are overprinted with the insulative material 108 in the pattern shown in FIG. 9. The pattern of the insulative material is slightly wider than the lead pattern shown in FIG. 8 to ensure that portions of the leads coated with the insulative material are fully isolated from the subsequently applied electrode layer, next described.

Figure 10:
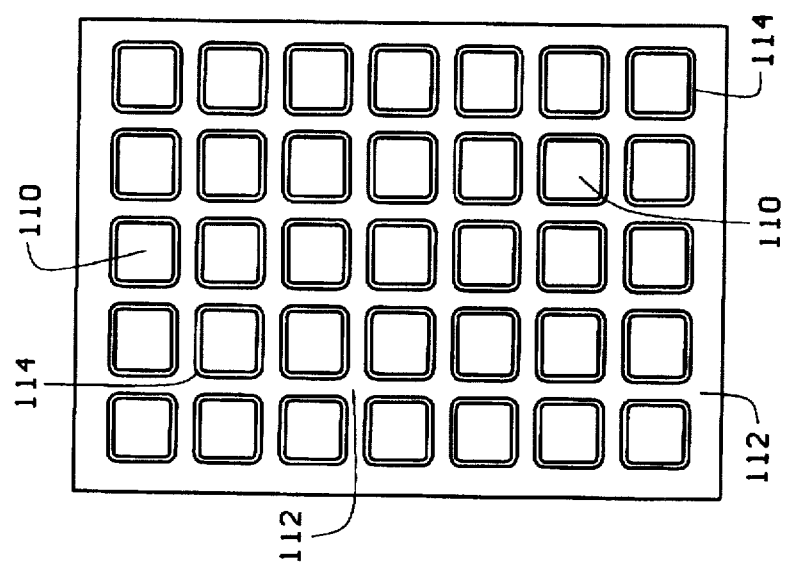
FIG. 10 is a top view of laminate layer comprising pixel and counter electrodes.

As used herein, the term "pixel electrodes" is used to describe working electrodes that are arranged in a matrix array. In this arrangement, the electrochromic effect that is selectively generated over each working electrode is usually just a single element of the overall generated image. Pixel electrodes 110 and a counter electrode 112 are next printed in the pattern shown in FIG. 10 over the laminate layers of FIGS. 8 and 9 such that the previously exposed ends of the silver printed working electrode leads 102 and counter electrode leads 104 contact the bottom sides of the pixel electrodes 110 and the counter electrode 112, respectively. Electrodes 110 and 112 are also printed using silver ink so that the ends of the leads 102 and 104 contact the electrodes 110 and 112 in a silver-to-silver interface. The silver printed electrodes 110 and 112 are then overprinted with a slightly wider carbon ink. As can be seen in FIG. 10, each pixel electrode 110 is separated from the counter electrode 112 by a peripheral gap 114. Note also that several portions of the electrodes 110, 112 will be isolated by the insulative ink 108 from the central lengths of several electrical leads extending thereunder. As illustrated, the pixel electrodes 110 are preferably arranged in a five by seven array, and the counter electrode 112 extends adjacent to and surrounds each pixel electrode 110.

By constructing a laminate electrode structure in this manner for selectively addressing an array of electrochromic pixels, the electrical lead layout is significantly simplified. Because the electrical leads are provided in a laminate layer separate from the electrode layer, complicated lead layouts, where the leads must be routed around the sides of the electrodes and avoid contact therewith, are eliminated. Instead, the leads can be printed preferably in a straight line between the electrode regions and the substrate connector region, and then central portions of the leads which will be positioned under one or more of electrodes 110, 112 are isolated therefrom by the insulative material 108. In addition to reducing the complexity of the laminate structure and simplifying its manufacture, this arrangement also reduces the amount of conductive ink required to print the electrical leads, thereby further reducing costs. This arrangement also allows the widths of the electrical leads to be varied so as to equalize the electrical resistance of each electrical lead with the other electrical leads.

In the sandwich-type arrangement of electrodes where a laminate electrode structure selectively addresses an array of pixel electrodes in one layer and the counter electrode or electrodes in another layer, the previously described counter electrode leads 104 and counter electrode 112 can be eliminated. In either embodiment, the above-described laminate electrode structure can then be utilized in the electrochromic display.

Figure 11B:
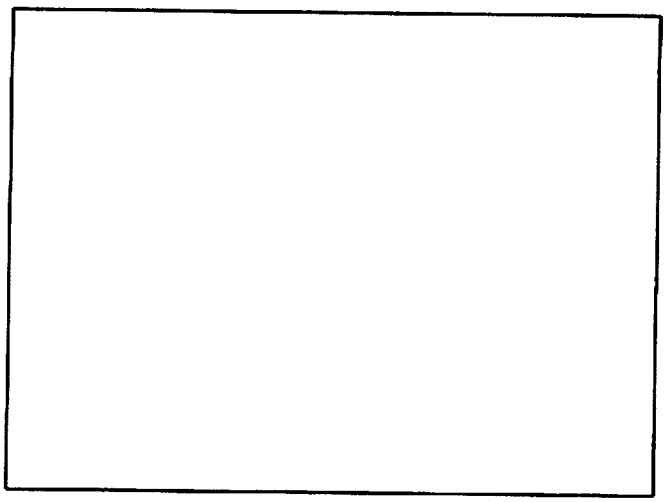
FIG. 11 is a top view of laminate layer comprising electrochromic material printed (A) over working and counter electrodes with gap therebetween and (B) over working and counter electrodes without gap.
Figure 11A:
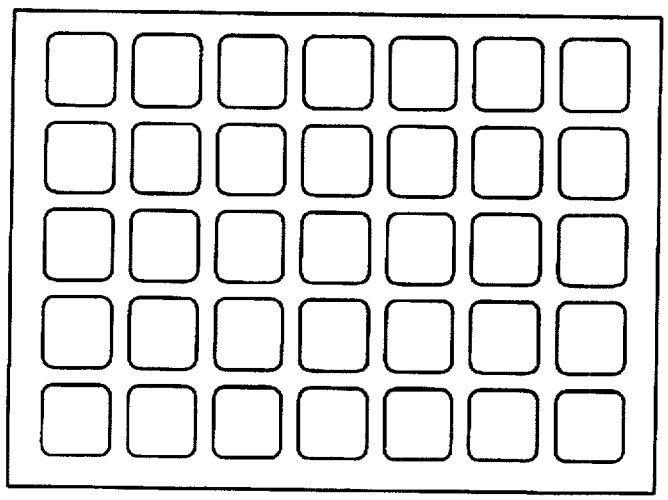

A laminate electrochromic display can be easily constructed from a laminate electrode structure having pixel and counter electrodes 110, 112 provided in a single laminate layer by applying a laminate layer of an electrochromic material over the electrode layer. The electrochromic material preferably covers both working and counter electrodes with either a gap between working and counter electrodes as in FIG. 11A or in a continuous layer of electrochromic material covering both working electrodes and counter electrodes as shown in FIG. 11B or the electrochromic layer. The electrochromic layer is then covered with a layer of an electrically conductive, essentially ionically conductive material (not shown), preferably an electrolyte material, for electrically connecting the pixel electrodes to the counter electrode through the electrochromic and electrolyte layers. Finally, the electrolyte layer is sealed with a sealing layer (not shown).

In this manner, a laminate electrochromic display having a single layer containing both pixel and counter electrodes can be easily and inexpensively constructed. Because the electrochromic pixels are arranged in a five-by-seven matrix array, a desired image can be generated on the display by selectively activating the appropriate electrochromic pixels. This is accomplished by applying a reference voltage to the counter electrode leads 104 while selectively applying a source voltage (positive or negative depending on the characteristics of the electrochromic material) to the appropriate working electrode leads 102. The electrical leads will conduct these potentials to their corresponding electrodes. The induced or applied electrical current will flow from (or to depending on the polarity of the source voltage) each working electrode lead having the source voltage applied thereto, then to the corresponding pixel electrode, through the corresponding electrochromic pixel, through the ionically conductive layer, and finally to the counter electrode. The induced current will create an electrochromic effect at the interface of the electrochromic pixel and the ionically conductive layer. In this manner, selected pixels can be activated to display an appropriate image.

The previously described methods for constructing a laminate electrochromic display having an array of pixel electrodes arranged in a rectangular pattern is equally applicable to the construction of a laminate electrochromic display having an array of working electrodes arranged in a different type of pattern. For example, the above-described methods can be repeated where the laminate layers shown in FIGS. 12–15 are substituted for the laminate layers shown in FIGS. 8–11 to yield a laminate electrochromic display having working electrodes arranged in a radial pattern. The method of this example can be used for providing an electrochromic analog clock display, which is but one example of where working electrodes arranged in a radial pattern would be desirable.

Figure 12:
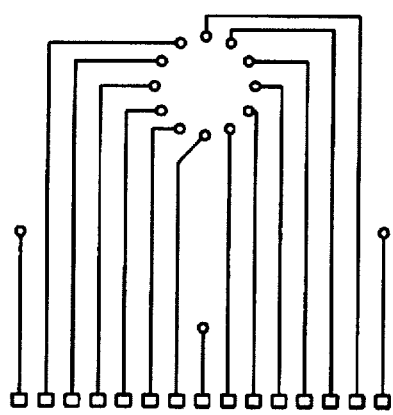
FIG. 12 is a top view of an alternate layer of working and counter electrode leads.
Figure 13:
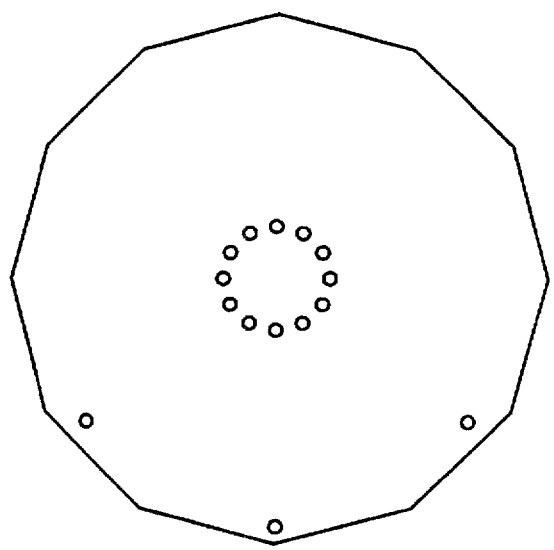
FIG. 13 is a top view of an insulative layer for covering the central portions of the working and counter electrode leads of FIG. 12.
Figure 14:
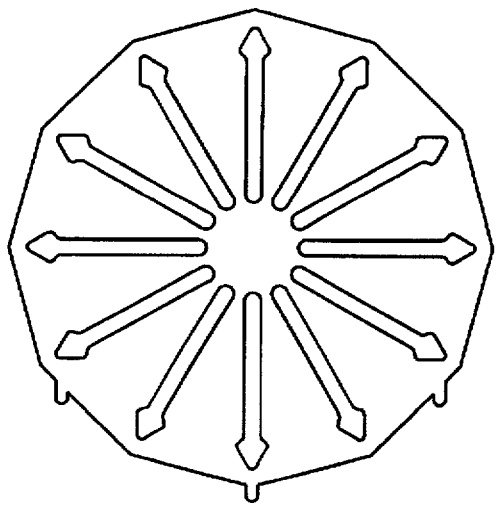
FIG. 14 is a top view of a laminate layer comprising working and counter electrodes with the working electrodes arranged in a radial pattern.
Figure 15:
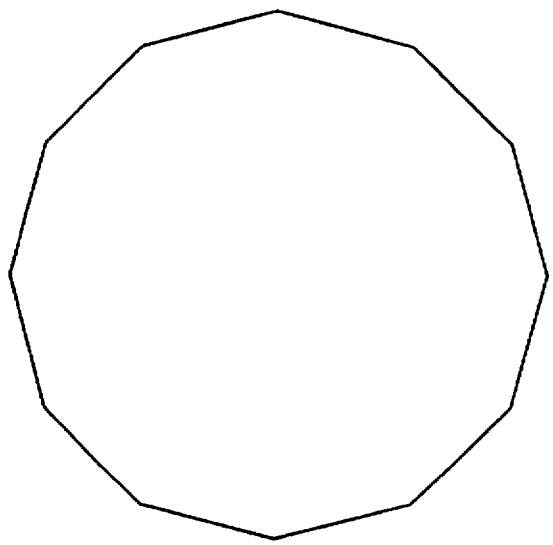
FIG. 15 is a top view of a laminate layer comprising electrochromic material disposed over the working and counter electrodes of FIG. 14.

According to the methods described above, working electrode leads 152 and counter electrode leads 154 are printed on a substrate in the pattern shown in FIG. 12. An insulative layer 158 is then applied over the electrical lead layer in the pattern shown in FIG. 13 to cover all but the ends of the leads. Working electrodes 160 and a counter electrode 162 are then printed in the pattern shown in FIG. 14. The electrochromic material is then printed over the working and counter electrodes in a continuous layer shown in FIG. 15. Over the electrochromic layer, a laminate layer comprising an ionically conductive material (not shown) is printed, and the ionically conductive layer is then covered with a sealing layer (not shown).

Figure 16A:
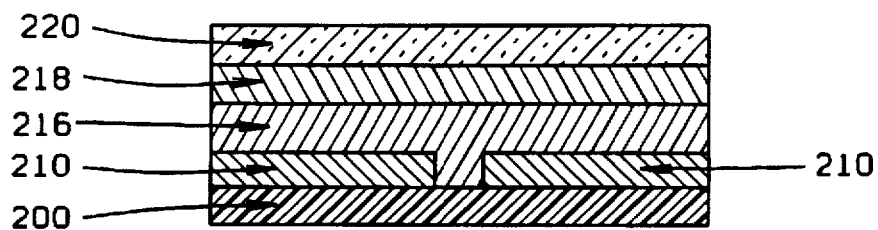
FIG. 16 illustrates cross-sectional views of laminate electrochromic displays having a non-conductive substrate layer (200), a layer comprised of a plurality of counter electrodes (210), and a layer comprised of a transparent working electrode (220) with (A) a layer containing an ionically conductive material (210) and a layer containing electrochromic material (218) or (B) a single layer containing both ionically conductive material and electrochromic material (217) between the counter electrode layer and the working electrode layer.
Figure 16B:
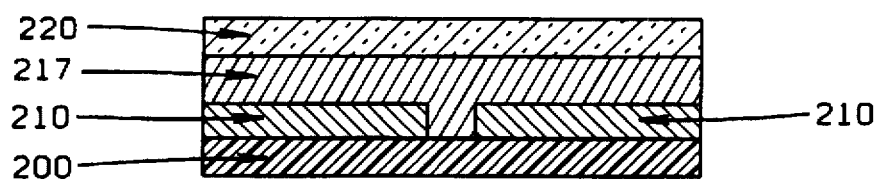
Figure 17:
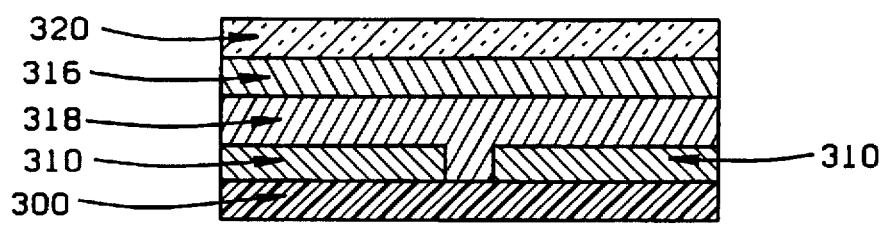
FIG. 17 illustrates cross-sectional views of laminate electrochromic displays having a non-conductive substrate layer (300), a layer comprised of a plurality of working electrodes (310), and a layer comprised of a transparent counter electrode (320) with (A) a layer containing an ionically conductive material (316) and a layer containing electrochromic material (318) between the counter electrode layer and the working electrode layer.
Figure 18:
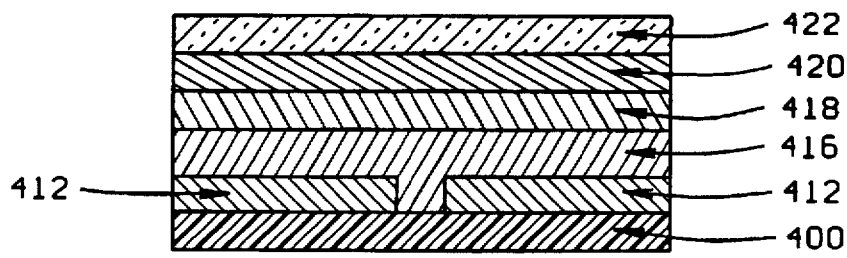
FIG. 18 illustrates a cross-sectional view of a laminate electrochromic display having a non-conductive substrate layer (400), a layer comprised of a plurality of electrodes that can serve collectively counter or working electrodes depending upon current direction (410), a layer comprising a first electrochromic material (412), a layer comprising an ionically conductive material (418), a layer comprising a second electrochromic material (420) and a layer comprising a transparent electrode that can serve as working or counter electrode depending upon current direction (420).

The methods of this invention can also be used to construct a laminate electrochromic display where the working electrodes and one or more counter electrodes are provided in separate laminate layers on opposite sides of the ionically conductive and electrochromic layers, i.e. in a sandwich arrangement of working and counter electrodes. Partial side views of such a displays are shown in FIGS. 16–18 in three embodiments. Depiction of the electrical leads and the insulative layer have been omitted for purposes of illustration. With reference to FIG. 16A, after the working electrode leads are printed on a substrate 200, and after an insulative material is applied over central portions of the working electrode leads, a laminate layer of counter electrodes is printed with each working electrode 210 in contact with one end of a working electrode lead. An ionically conductive electrolyte layer 216 is then applied over the electrode layer, followed by a laminate layer comprising electrochromic material 218. A transparent working electrode layer 220 is then applied over the electrochromic layer 218. In an alternative embodiment shown in FIG. 16B, the electrochromic material is incorporated with the electrolyte into a single layer 217.

FIG. 17 illustrates an alternative embodiment using the sandwich-type arrangement of electrodes in which the working electrode leads are printed on a substrate 300 and after an insulative material is applied over central portions of the working electrode leads, a laminate layer of working electrodes is printed with each working electrode 310 in contact with one end of a working electrode lead. An electrochromic layer 318 is then applied over the electrode layer, followed by a laminate layer comprising an ionically conductive material 316. A transparent counter electrode layer 320 is then applied over the ionically conductive layer 316.

In an alternative embodiment, the electrochromic material is incorporated with the electrolyte into a single layer.

FIG. 18 illustrates still another embodiment using a sandwich-type arrangement of electrodes. In this embodiment, the electrode leads and insulative material covering all but the ends of the leads are printed on a substrate 400 and a laminate layer of electrodes is then printed with each electrode 410 in contact with one end of an electrode lead. An electrochromic layer 416 is then applied over the electrode layer, followed by a laminate layer comprising an ionically conductive material 418. On the ionically conductive layer a second electrochromic layer 420 is then printed and a transparent counter electrode layer 422 is then applied over the electrochromic layer 418. In this embodiment, the electrodes 412 can collectively serve as working electrodes and the transparent electrode 422 can serve as the counter electrode or alternatively, the electrodes 412 can collectively serve as counter electrodes with the transparent electrode 422 serving as working electrode, dependent upon the direction of applied voltage.

By applying an electrical potential across working and counter electrodes in the devices above, an electrochromic effect is generated at the interface of the activated electrochromic display segments and the ionically conductive layer. Although these embodiment of the present invention requires use of a transparent counter electrode due to the position of the counter electrode at an outermost layer through which light must be transmitted, the overall layout of the display is simplified by eliminating a need for applying the counter electrode in a pattern that extends up to and surrounds each electrode in layer containing an array of electrodes.

While specific embodiments have been described herein, it should be apparent to those skilled in the art that various modifications thereof can be made without departing from the true spirit and scope of the invention. Accordingly, it is intended that the following claims, and their equivalents, cover all such modifications within the full inventive concept.

What is claimed is:

1. A laminate electrochromic display comprising:
   (a) a laminate layer of a nonconductive substrate material;
   (b) a laminate layer containing a plurality of electrical leads disposed on said substrate layer wherein each electrical lead includes opposite ends and a central length extending therebetween and wherein an insulative material is disposed over the central lengths of said electrical leads;
   (c) a laminate layer comprising side-by-side electrodes disposed on said electrical-lead layer including at least one counter electrode and a plurality of working electrodes wherein each electrode contacts an end of an electrical lead; and
   (d) a laminate layer comprising an electrochromic material disposed on said electrode layer;
   wherein a portion of said electrode layer is isolated by said insulative material from the electrical lead layer extending thereunder.

2. The laminate electrochromic display of claim 1 wherein the electrochromic layer also contains an ionically conductive material.

3. The laminate electrochromic display of claim 1 further comprising a laminate layer comprising an ionically conductive material disposed over said electrochromic layer.

4. The laminate electrochromic display of claim 1 wherein said plurality of working electrodes are pixel electrodes arranged in a rectangular pattern.

5. The laminate electrochromic display of claim 4 wherein said plurality of pixel electrodes are arranged in a five by seven array.

6. The laminate electrochromic display of claim 4 wherein said plurality of working electrodes are separately addressed by individual ones of said plurality of electrical leads.

7. The laminate electrochromic display of claim 1 wherein said plurality of working electrodes are arranged in a radial pattern.

8. The laminate electrochromic display of claim 7 wherein said plurality of working electrodes are separately addressed by individual ones of said plurality of electrical leads.

9. The laminate electrochromic display of claim 1 wherein said counter electrode extends adjacent to at least one side of each working electrode.

10. The laminate electrochromic display of claim 9 wherein said counter electrode surrounds each working electrode.

11. The laminate electrochromic display of claim 1 wherein said electrochromic material is an electrically conductive, essentially ionically isolative dispersion of electrically conductive electrochromic particles in a transparent or translucent polymeric matrix.

12. A laminate structure for selectively addressing an array of electrodes, said laminate structure comprising:
    (a) a laminate layer of a nonconductive substrate material;
    (b) a laminate layer comprising at least three electrical leads disposed over said substrate layer, each electrical lead having opposite ends and a central length extending therebetween wherein an insulative material is disposed over the central lengths of said electrical leads; and
    (c) a laminate layer of side-by-side electrodes, each electrode being disposed over and in electrical contact with one of the opposite ends of said electrical leads and a portion of said side-by-side electrodes being disposed over and separated from a portion of said layer of at least three electrical leads.

13. The laminate electrode structure of claim 12 wherein the laminate structure addresses an array of electrochromic display segments activated by the electrodes.

14. The laminate electrode structure of claim 13 wherein said electrochromic display segments are electrochromic pixels and said working electrodes are pixel electrodes arranged in a rectangular pattern.

15. The laminate electrode structure of claim 14 wherein said pixel electrodes are arranged in a five by seven array.

16. The laminate electrode structure of claim 12 wherein said working electrodes are arranged in a radial pattern.

17. The laminate electrode structure of claim 16 wherein said electrode layer includes a counter electrode extending adjacent to at least one side of each working electrode.

18. The laminate electrode structure of claim 17 wherein said counter electrode surrounds each working electrode.

19. The laminate electrode structure of claim 12 wherein said substrate layer comprises a flexible polymeric material.

20. A laminate electrochromic display comprising:
    (a) a laminate layer of a nonconductive substrate material;
    (b) a laminate layer containing a plurality of electrical leads disposed on said substrate layer wherein each electrical lead includes opposite ends and a central length extending therebetween and wherein an insulative material is disposed over the central lengths of said electrical leads;
    (c) a laminate layer comprising a plurality of counter electrodes disposed on the electrical lead layer wherein each electrode contacts an end of an electrical lead and a portion of the laminate layer comprising a plurality of counter electrodes is disposed over the insulative material;
    (d) a laminate layer comprising an electrochromic material disposed on said electrical lead layer; and
    (e) a laminate layer comprising a transparent working electrode disposed on said electrochromic layer.

21. The laminate electrochromic display of claim 20 wherein the electrochromic layer also contains an ionically conductive material.

22. The laminate electrochromic display of claim 20 further comprising a laminate layer comprising an ionically conductive material disposed between the electrochromic layer and the transparent working electrode layer.

23. A laminate electrochromic display comprising:
    (a) a laminate layer of nonconductive substrate material;
    (b) a laminate layer containing a plurality of electrical leads disposed on said substrate layer wherein each electrical lead includes opposite ends and a central length extending therebetween and wherein an insulative material is disposed over the central lengths of said electrical leads;

(c) a laminate layer comprising a plurality of working electrodes disposed on the electrical lead layer wherein each electrode contacts an end of an electrical lead and a portion of the laminate layer comprising a plurality of working electrodes is disposed over the insulative material;

(d) a laminate layer comprising a transparent counter electrode disposed over said electrical lead layer; and (e) a laminate layer comprising a transparent counter electrode disposed over said ionically conductive layer.

24. The laminate electrochromic display of claim 23 wherein the electrochromic layer also contains an ionically conductive material.

25. The laminate electrochromic display of claim 23 further comprising a laminate layer comprising an ionically conductive material disposed between the electrochromic layer and the working electrode layer.

26. A laminate electrochromic display comprising:

(a) a laminate layer of a nonconductive substrate material;

(b) a laminate layer containing a plurality of electrical leads disposed on said substrate layer wherein each electrical lead includes opposite ends and a central length extending therebetween and wherein an insulative material is disposed over the central lengths of said electrical leads;

(c) a laminate layer comprising a plurality of electrodes disposed on the electrical lead layer wherein each electrode contacts an end of an electrical lead a portion of the laminate layer comprising a plurality of electrodes is disposed over the insulative material;

(d) a laminate layer comprising a first electrochromic material disposed over said electrical lead layer;

(e) a laminate layer comprising an ionically conductive material disposed over the layer containing said first electrochromic material;

(f) a laminate layer comprising a second electrochromic material disposed over said ionically conductive layer; and (g) a laminate layer comprising a transparent counter electrode disposed over the layer containing said second electrochromic material.

27. A laminate electrochromic display comprising:

(a) a laminate layer of a nonconductive substrate material;

(b) a laminate layer containing a plurality of electrical leads disposed on said substrate layer wherein each electrical lead includes opposite ends and a central length extending therebetween and wherein an insulative material is disposed over the central lengths of said electrical leads;

(c) a laminate layer comprising side-by-side electrodes disposed on said electrical lead layer including at least one counter electrode and a plurality of working electrodes wherein each electrode contacts an end of an electrical lead and said counter electrode extends adjacent to at least one side of each working electrode and surrounds each working electrode; and (d) a laminate layer comprising an electrochromic material disposed on said electrode layer.

28. The laminate electrochromic display of claim 27 wherein the electrochromic layer also contains an ionically conductive material.

29. The laminate electrochromic display of claim 27 further comprising a laminate layer comprising an ionically conductive material disposed over said electrochromic layer.

30. (New) The laminate electrochromic display of claim 27 wherein said electrochromic material is an electrically conductive, essentially ionically isolative dispersion of electrically conductive particles in a transparent or translucent polymeric matrix.

31. The laminate electrochromic display of claim 27 wherein said substrate layer comprises a flexible material.

32. The laminate electrochromic display of claim 27 wherein said plurality of working electrodes are pixel electrodes arranged in a rectangular pattern.

33. The laminate electrochromic display of claim 32 wherein said plurality of pixel electrodes are arranged in a five-by-seven array.

34. The laminate electrochromic display of claim 32 wherein said plurality of working electrodes are separately addressed by individual ones of said plurality of electrical leads.

35. The laminate electrochromic display of claim 27 wherein said plurality of working electrodes are arranged in a radial pattern.

36. The laminate electrochromic display of claim 35 wherein said plurality of working electrodes are separately addressed by individual ones of said plurality of electrical leads.

37. A laminate electrochromic display comprising:

(a) a laminate layer of a flexible, nonconductive substrate material;

(b) a laminate layer containing a plurality of electrical leads disposed on said substrate layer wherein each electrical lead includes opposite ends and a central length extending therebetween and wherein an insulative material is disposed over the central lengths of said electrical leads;

(c) a laminate layer comprising side-by-side electrodes disposed on said electrical lead layer including at least one counter electrode and a plurality of working electrodes; and (d) a laminate layer comprising an electrochromic material disposed on said electrode layer.

38. The laminate electrochromic display of claim 37 wherein the electrochromic layer also contains an ionically conductive material.

39. The laminate electrochromic display of claim 37 further comprising a laminate layer comprising an ionically conductive material disposed over said electrochromic layer.

40. The laminate electrochromic display of claim 37 wherein said electrochromic material is an electrically conductive, essentially ionically isolative dispersion of electrically conductive particles in a transparent or translucent polymeric matrix.

41. The laminate electrochromic display of claim 37 wherein said plurality of working electrodes are pixel electrodes arranged in a rectangular pattern.

42. The laminate electrochromic display of claim 41 wherein said plurality of pixel electrodes are arranged in a five-by-seven array.

43. The laminate electrochromic display of claim 41 wherein said plurality of working electrodes are separately addressed by individual ones of said plurality of electrical leads.

44. The laminate electrochromic display of claim 37 wherein said plurality of working electrodes are arranged in a radial pattern.

45. The laminate electrochromic display of claim 44 wherein said plurality of working electrodes are separately addressed by individual ones of said plurality of electrical leads.

46. A laminate structure for selectively addressing an array of electrodes, said laminate structure comprising:

(a) a laminate layer of a nonconductive substrate material;

(b) a laminate layer comprising at least three electrical leads disposed over said substrate layer, each electrical lead having opposite ends and a central length extending therebetween wherein an insulative material is disposed over the central lengths of said electrical leads; and (c) a laminate layer of side-by-side electrodes, each electrode being disposed over and in electrical contact with one of the opposite ends of said electrical leads, said laminate layer of side-by-side electrodes including a counter electrode extending adjacent to at least one side of each working electrode, said counter electrode surrounding each working electrode.

47. The laminate electrode structure of claim 46 wherein the laminate structure addresses an array of electrochromic display segments activated by the electrodes.

48. The laminate electrode structure of claim 47 wherein said electrochromic display segments are electrochromic pixels and said working electrodes are pixel electrodes arranged in a rectangular pattern.

49. The laminate electrode structure of claim 48 wherein said electrodes are arranged in a five by seven array.

50. The laminate electrode structure of claim 46 wherein said working electrodes are arranged in a radial pattern.

51. The laminate electrode structure of claim 46 wherein said substrate layer comprises a flexible polymeric material.

52. A laminate structure for selectively addressing an array of electrodes, said laminate structure comprising:

(a) a laminate layer of a flexible, nonconductive substrate material;

(b) a laminate layer comprising at least three electrical leads disposed over said substrate layer, each electrical lead having opposite ends and a central length extending therebetween wherein an insulative material is disposed over the central lengths of said electrical leads; and (c) a laminate layer of side-by-side electrodes, each electrode being disposed over and in electrical contact with one of the opposite ends of said electrical leads.

53. The laminate electrode structure of claim 52 wherein the laminate structure addresses an array of electrochromic display segments activated by the electrodes.

54. The laminate electrode structure of claim 53 wherein said electrochromic display segments are electrochromic pixels and said working electrodes are pixel electrodes arranged in a rectangular pattern.

55. The laminate electrode structure of claim 54 wherein said electrodes are arranged in a five by seven array.

56. The laminate electrode structure of claim 52 wherein said working electrodes are arranged in a radial pattern.

57. The laminate electrode structure of claim 52 wherein said electrode layer includes a counter electrode extending adjacent to at least one side of each working electrode.

58. The laminate electrode structure of claim 57 wherein said counter electrode surrounds each working electrode.

59. A laminate electrochromic display comprising:

(a) a laminate layer of a flexible, nonconductive substrate material;

(b) a laminate layer containing a plurality of electrical leads disposed on said substrate layer wherein each electrical lead includes opposite ends and a central length extending therebetween and wherein an insulative material is disposed over the central lengths of said electrical leads;

(c) a laminate layer comprising a plurality of counter electrodes disposed on the electrical lead layer wherein each electrode contacts an end of an electrical lead;

(d) a laminate layer comprising an electrochromic material disposed on said electrical lead layer; and (e) a laminate layer comprising a transparent working electrode disposed on said electrochromic layer.

60. The laminate electrochromic display of claim 59 wherein the electrochromic layer also contains an ionically conductive material.

61. The laminate electrochromic display of claim 59 further comprising a laminate layer comprising an ionically conductive material disposed between the electrochromic layer and the transparent working electrode layer.

62. A laminate electrochromic display comprising:

(a) a laminate layer of flexible, nonconductive substrate material;

(b) a laminate layer containing a plurality of electrical leads disposed on said substrate layer wherein each electrical lead includes opposite ends and a central length extending therebetween and wherein an insulative material is disposed over the central lengths of said electrical leads;

(c) a laminate layer comprising a plurality of working electrodes disposed on the electrical lead layer wherein each electrode contacts an end of an electrical lead;

(d) a laminate layer comprising an electrochromic material disposed on said electrical lead layer; and (e) a laminate layer comprising a transparent counter electrode disposed over said ionically conductive layer.

63. The laminate electrochromic display of claim 62 wherein the electrochromic layer also contains an ionically conductive material.

64. The laminate electrochromic display of claim 62 further comprising an ionically conductive material disposed between the electrochromic layer and the working electrode layer.

65. A laminate electrochromic display comprising:

(a) a laminate layer of a flexible, nonconductive substrate material;

(b) a laminate layer containing a plurality of electrical leads disposed on said substrate layer wherein each electrical lead includes opposite ends and a central length extending therebetween and wherein an insulative material is disposed over the central lengths of said electrical leads;

(c) a laminate layer comprising a plurality of electrodes disposed on the electrical lead layer wherein each electrode contacts an end of an electrical lead;

(d) a laminate layer comprising a first electrochromic material disposed over said electrical lead layer;

(e) a laminate layer comprising an ionically conductive material disposed over the layer containing said first electrochromic material;

(f) a laminate layer comprising a second electrochromic material disposed over said ionically conductive layer; and (g) a laminate layer comprising a transparent counter electrode disposed over the layer containing said second electrochromic material.

* * * * *